March 14, 1967  P. K. SCHILLING  3,309,448

METHOD OF PRODUCING TWO TONE DISHES AND THE LIKE

Filed Oct. 8, 1962

INVENTOR
PAUL K. SCHILLING
BY Robert M. Dunning
ATTORNEY

United States Patent Office 3,309,448
Patented Mar. 14, 1967

3,309,448
METHOD OF PRODUCING TWO TONE DISHES AND THE LIKE
Paul K. Schilling, St. Paul, Minn., assignor to Plastics Inc., St. Paul, Minn., a corporation of Minnesota
Filed Oct. 8, 1962, Ser. No. 228,875
3 Claims. (Cl. 264—245)

This application is a continuation-in-part of my previously filed application Serial No. 721,983, filed March 17, 1958, now abandoned.

This invention relates to an improvement in method of forming two tone dishes and other articles of a similar nature cast of thermosetting resin, and deals particularly with a method of forming an article having two laminations of different colored plastic in the same casting.

Various methods have been attempted to produce plastic dish ware which simulates expensive thin china and which is produced with different colors on opposite surfaces. For example, efforts have been made to apply a thin layer of plastic powder of one color into a female mold cavity and to apply over this a layer of different colored plastic powder. Most such attempts have met with failure or at least a high proportion of rejected articles due to the difficulty in controlling the flow of the plastic during the casting process. Furthermore, in making dish ware and the like, it is usually desired to provide a white or light colored surface on the concave side of the dish and to provide a dark colored covering on the outer surface. In order that the dark color be invisible from the concave side of the dish, it is usually necessary to have the outer layer of darker colored plastic relatively thin and to have the lighter or concave surface of the dish relatively thicker. It is also necessary to slightly overfill the die with powder in order to completely form the article being cast. As the male portion of the die or mold entered the female portion, the excess plastic must flow to the periphery of the dish to exude as flashing from the periphery thereof. This movement of the powder during the molding operation has tended to cause rifts in the thin outer coating which were usually visible in the form of radially extending streaks in the convex surface of the article molded.

It is an object of the present invention to avoid the difficulties previously encountered in producing two toned articles such as dish ware and the like. It has been found possible and practical to mold such articles in a single die by inverting the mold parts and casting the thick inner liner of the article in a first casting operation and to subsequently flow a thin covering of the second color, which is usually a darker color than the first, over the convex surface of the inner liner. This operation is carried on to completion in a single die thus avoiding much of the difficulty previously experienced.

A feature of the present process resides in the step of casting the inner liner in the mold or die for a time period insufficient to completely set the plastic, to open the die, to add plastic of the second color, and to reclose the die while the plastic of the inner liner is still in a moldable state and to retain the mold closed until the plastic has set. As the die closes during the second operation, the plastic powder of the second color flows evenly over the surface of the liner to form a thin even coating over the entire outer surface of the article.

In the casting of plastic articles, the plastic being cast will normally remain in the concave or female portion of the die when the die is separated. The present process includes a method and apparatus for retaining the molded piece on the male portion of the die so that the covering layer of plastic of a different color may be applied over the convex surface of the article without removing the article from the mold.

A feature of the present process lies in first casting an article of one color in the mold and in retaining the article in the mold a time sufficient to give the article a surface hardness capable of withstanding the second molding operation when added plastic powder is inserted into the die but in opening the die before the plastic has set. If the liner is retained in the die an insufficient time, the liner is too soft to withstand the second molding operation and the liner will crack or blow when the press is closed the second time. At the same time, if the liner remains in the mold an excessive period of time, the plastic will be too hard to laminate with the outer coating and the two colors will not unite as a solid one piece article. While the times and pressures vary with different types of plastic and different thicknesses of the articles being cast, the liner must be still in a moldable state at the completion of the first casting operation so that it will flow sufficiently to permit the second color to completely cover the convex surface of the article being formed.

These and other objects and novel features of the present invention will be more clearly and fully set forth in the following specification and claims.

In the drawings forming a part of the specification:

In the following description reference is made to plastic dishes as such dishes are typical of the type of articles cast by the present process. It should be understood, however, that other articles having a convex outer surface and a concave inner surface may similarly be formed if desired and that the reference to dishes is only typical of one type of article which may be produced.

As has been previously stated, in the casting of concave plastic articles from thermosetting plastic resins the mold is normally formed with the convex or female portion of the die resting upon the bed of the press and the convex portion or male portion of the mold mounted on the upper portion of the press. During the molding operation, the upper or male portion of the mold usually reciprocates downwardly into the female portion of the mold and is retained therein a time required to set the resin. This time varies with different thermosetting resins and with the proportion of filler used in conjunction with these resins. However, the time required for setting the resin is usually readily available from the manufacturer or in any event can be readily determined by tests.

There are several advantages in having the female portion of the die retained on the bed of the press. One of the primary advantages lies in the fact that the molded piece will normally remain engaged in the female part of the mold and the molded article may be more easily ejected from the mold when in this position. Furthermore, it is simpler and easier to insert the plastic powder within the cavity formed by the female part of the mold than to apply it to the male portion thereof. For these and other reasons, all concave molds are normally made with the female portion of the mold beneath the male portion thereof.

In the present invention, the normal procedure is reversed. The female portion of the mold is indicated by the numeral 10, is mounted upon the upper portion of the press which is normally vertically reciprocable and the male portion thereof which is indicated by the numeral 11 is mounted upon the bed of the press which is normally stationary. Thus, the position of the mold is inverted from its normal position.

Figure 2:
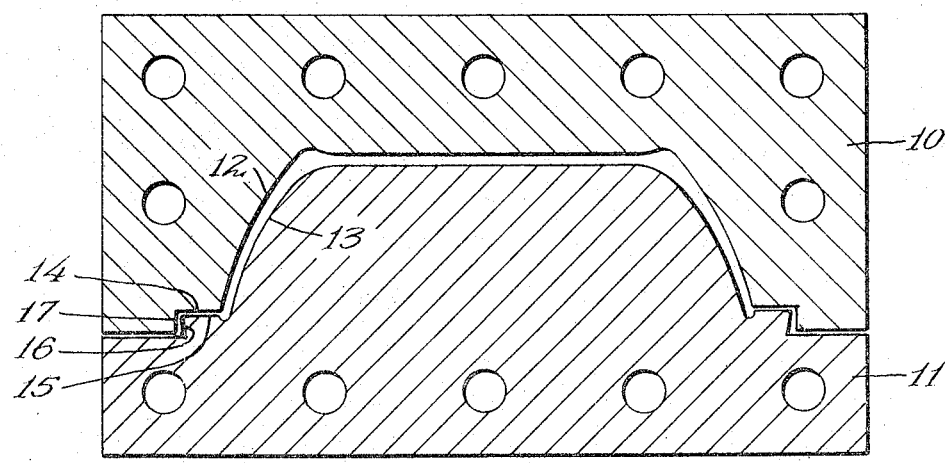
FIGURE 2 is a cross sectional view through the die showing the manner in which the part being molded is locked to the male portion of the die during the casting operation.

As indicated in FIGURE 2, the concave surface 12 of the female mold portion 10 is spaced a desired distance from the convex surface 13 of the male portion 11 of the mold to cast an article of one thickness between the two mold portions. As is usual practice in casting articles of this type, the female mold portion 10 is provided with a flang 14 extending laterally from the periphery of the piece being cast and the male portion of the mold is provided with a similar flange 15 parallel to the flange 14. In order to completely fill the mold about its entire periphery, it is usual practice to insert into the mold an amount of plastic powder which is slightly in excess of the amount required to form the article being cast. As the two parts of the mold are pressed together, the excess plastic will flow laterally from the periphery of the piece being cast to form an extremely thin shell or flashing encircling the periphery of the cast article. This flashing is later removed in any suitable manner such as by rotating the cast article with a file held against the periphery of the article or by other suitable means.

In the present invention, the male portion 11 of the mold is provided with a generally cylindrical flange portion 16 adjoining the flange 15 which may be slightly undercut or tapered inwardly and downwardly. As a result, when the mold is closed, the excess plastic flows about the flange 16 and grips this flange tightly enough to hold the molded article upon the male portion 11 of the mold when the mold is open. This feature is of importance as it eliminates the necessity of removing the molded liner from the female mold at the completion of the first molding operation and replacing it upon the male portion. The mold is sufficiently overfilled with plastic powder as to insure the flow of flashing along the undercut flange 16 at least throughout the major portion of the periphery of the article.

Figure 3:
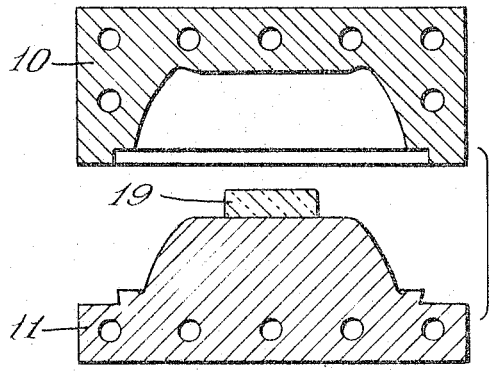
FIGURE 3 is a diagrammatic view of the mold in open position showing the preformed disk of plastic powder in position in the mold prior to the closing of the mold.

As an example of the present method, cellulose filled melamine formaldehyde powdered resin is first preferably precast by pressure into a disk or other shape having sufficient volume to fill the mold cavity and provide the necessary flashing. In one particular instance, this powder is white or slightly off white to provide the same color as bone china or the like. The disk of powder is placed upon the male portion 11 of the mold, the disk being indicated by the numeral 19 in FIGURE 3 of the drawings. Prior to the insertion of the disk of powder into the mold, the disk is normally preheated so as to reduce the molding cycle. The die is then closed for a timed period of perhaps 50 seconds which in the instance described is insufficient to set the plastic but is sufficient to produce a surface hardness capable of withstanding the second molding operation. The die is then opened while the plastic is still in a moldable state.

Figure 1:
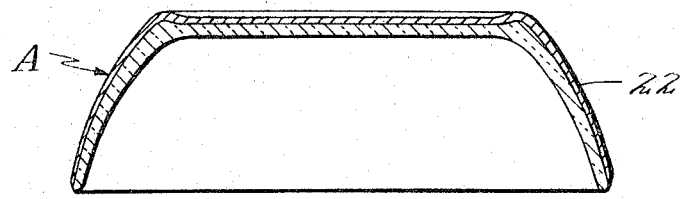
FIGURE 1 is a cross sectional view through a typical article formed by the process, the thickness of the layers being exaggerated in order to show the relationship therebetween.
Figure 4:
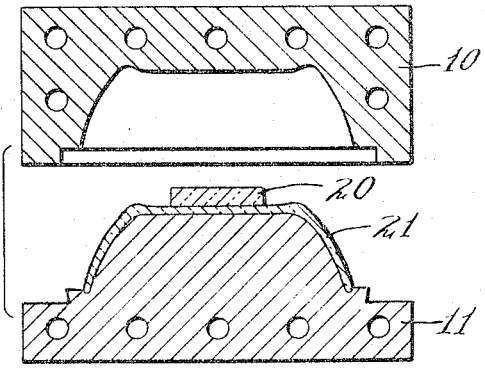
FIGURE 4 is a view similar to FIGURE 3 showing the mold in open position at the completion of the first casting operation and showing a second disk of plastic powder in position to flow over the convex surface of the liner.
Figure 5:
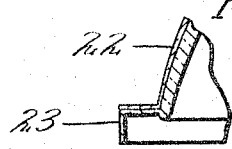
FIGURE 5 is a sectional view through an edge of the article formed before the flashing has been removed therefrom.

A second disk 20 of a similar resin powder of a different color such as charcoal gray is then placed upon the cast liner which is indicated in FIGURE 4 by the numeral 21. The mold is thus again overfilled by the amount of powder in the second disc. The disk 20 is considerably smaller than the disk 19 as the outer covering layer is preferably relatively thin. The die is again closed for a period of perhaps one minute and ten seconds which is sufficient to set the relatively thin outer layer as well as the liner 21. The outer layer is indicated in FIGURE 1 of the drawings by the numeral 22.

The cast article which is indicated in general by the letter A is then removed from the male portion of the mold by breaking enough of the flashing or by flexing the thin flashing layers sufficiently to permit the withdrawal of the article. The mold is then preferably cleaned by a stream of compressed air or the like and a new cycle of operation started. When the cast articles A with the thin flashing wall 23 encircling or partially encircling the same are sufficiently cooled to handle conveniently, the flashing is removed by any suitable means. As an example, the article A is placed between a pair of clamping blocks which are rotatably supported about the axis of the article and an abrasive tool or the like is applied to the periphery of the article to remove the flashing and to provide a finished edge to the article.

Various types of thermosetting resins may be employed and obviously the time during which the article remains in the mold varies to some extent with the type of plastic, the temperature of the mold, the thickness of the cast article, and other such variables. However, in each instance, the liner is still in a moldable state after the first casting operation and the resin is not set until during the second casting operation.

The description of molding times, temperatures and pressures have been minimized as these are variable. Using the same temperature and pressure, the cycle time is often varied somewhat when using different batches of the same resin. However, the description is adequate for those skilled in the art to fully understand the method. By following the method, and discontinuing the first molding operation at the proper point, the resulting article produced by my two step two color process will have the desirable physical and chemical characteristics that are obtained by molding the same part of one color in one uninterrupted cycle.

If the method is carried on using temperatures and pressures consistent with good molding practice, the article will have a uniformity of color in each layer. In other words, no streaks or fade marks will be visible and no light or dark depressions visible. This is in part due to the molding of the articles with the male mold directed upwardly. Using the same method, the results obtained when the convex mold surface is upwardly directed greatly exceeds those obtained from the conventional mold arrangement in which the female concave mold is lowermost.

While I have described the method as using preforms of plastic powder, this is optional depending upon the part being molded. In molding smaller pieces, the use of loose powder in the mold, particularly in the second step, seems advantageous. The preheating of the powder is also optional.

When molded in the manner described through the use of a single mold, the female portion of the mold is obviously spaced from the male mold portion a slightly greater distance axially of the mold after the second molding operation than after the first molding operation, due to the slight increase in thickness of the molded article when the thin outer layer is added. As a result, the thickness of the outer layer 22 is constant throughout the article if measured in a direction parallel to the axis of the molded article. However, the actual thickness of the outer layer, measured in a direction normal to the surface, varies with the degree of convexity of the mold.

This variation in thickness naturally occurs in molding a concavo-convex article, as only the axial distance between the two mold parts varies, while the radial distances from the mold axes remain constant. Obviously, if the outer wall of the molded article was cylindrical, the outer layer would not flow over this surface, and the second layer would extend only over the base of the mold. Thus, in molding an article such as a cup, where the rim of the cup is at a considerable angle to a plane normal to the cup axis, the thickness of the layer is much less than across the base of the cup which is on a plane generally normal to the cup axis. In the mold illustrated, the encircling peripheral concave wall surface 12 of the female mold has a cross-sectional area normal to the vertical axis of the mold which continually increases from the base area of the female mold toward the end of the female die. Furthermore, the wall surface, on a section through the vertical wall axis, curves toward parallel relation with the vertical mold axis toward the end of the female mold.

This variation in thickness may produce an unusual effect if the molding powder is not completely opaque. Due to the very slight thickness of the outer layer, it is possible for the inner layer to slightly "show through" the outer layer, producing a somewhat iridescent appearance to the article.

In accordance with the patent statues, I have described the principles of construction and operation of my improvement in method of forming two tone dishes and other articles cast of thermosetting resin, and while I have endeavored to set forth the best embodiment thereof, I desire to have it understood that changes may be made within the scope of the following claims without departing from the spirit of my invention.

I claim:
1. A method of forming two-toned thermosetting articles of concavo-convex form having a base portion and an encircling concave wall terminating in a marginal lip, by the use of a mold including a male die and a female die providing, when closed, a mold cavity therebetween, the female die having a base area and an encircling peripheral concave wall surface having a cross-sectional area normal to the vertical axis which continually increases from the base area toward the end of the female die, and the wall surface, on a section through the vertical axis of the female mold, curving toward parallel relation with the vertical mold axis toward the end of the female mold, the method including the steps of:
    placing a first amount of thermosetting resin power of one color between the mold dies, the amount of powder being sufficient to fill the mold cavity,
    compressing the first amount of powder between the dies, filling the mold cavity under heat and pressure for a time sufficient to produce a formed article having a surface hardness sufficient to withstand a second casting operation with additional thermosetting resin powder but which time is insufficient to set the resin,
    opening the mold cavity,
    overfilling the mold cavity by adding additional thermosetting resin powder of a color contrasting with the first-mentioned powder and in an amount sufficient to completely cover the convex surface of the formed article but substantially less than said first amount of powder used to produce the formed article,
    closing the mold to bring the surfaces of the molded article wall and the female die closer together adjacent the lip of the formed article than adjacent the base portion of the formed article, thereby flowing a layer of plastic over the surface of the formed article which is relatively thick at the base portion of the formed article and which is relatively thin at the lip end of the formed article.

2. The method of claim 1 and including the step of flowing a portion of the first amount of thermo-setting resin powder between the dies in the form of flashing, and flowing a portion of said additional powder between the dies by the closing of the mold to form flashing overlying the first formed flashing.

3. The method of claim 1 in which the male mold is grooved to form the end of the mold cavity, and including the step of forcing some of said additional powder between said dies to provide flashing spaced from the lip of the formed articles.

References Cited by the Examiner

UNITED STATES PATENTS

| | | | |
|---|---|---|---|
| 2,244,565 | 6/1941 | Nast | 161—258 |
| 2,364,388 | 12/1944 | Purinton et al. | 264—161 |
| 2,399,117 | 4/1946 | Hart | 18—42 |
| 2,541,297 | 2/1951 | Sampson | 18—59 |
| 2,945,266 | 7/1960 | Mainardi | 18—59 |
| 3,027,044 | 3/1962 | Winstead | 220—63 |
| 3,086,679 | 4/1963 | Bijvoet | 220—63 |

ROBERT F. WHITE, *Primary Examiner.*

ALEXANDER H. BRODMERKEL, R. B. MOFFITT,
*Assistant Examiners.*